United States Patent
Tran et al.

(10) Patent No.: US 10,733,529 B1
(45) Date of Patent: Aug. 4, 2020

(54) METHODS AND APPARATUS FOR DETERMINING ORIGINAL ELECTRONIC MESSAGES THAT CONTAIN ASKS

(71) Applicant: Google Inc., Mountain View, CA (US)

(72) Inventors: Duan Tran, San Jose, CA (US); Kiam Choo, Fremont, CA (US); William Pearce, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 933 days.

(21) Appl. No.: 15/351,736

(22) Filed: Nov. 15, 2016

Related U.S. Application Data

(60) Provisional application No. 62/255,499, filed on Nov. 15, 2015.

(51) Int. Cl.
*G06N 20/00* (2019.01)
*H04L 12/58* (2006.01)

(52) U.S. Cl.
CPC .............. *G06N 20/00* (2019.01); *H04L 51/04* (2013.01)

(58) Field of Classification Search
CPC .......... G06N 20/00; G06N 5/02; G06N 99/00; H04L 51/04; H04L 51/24; H04L 51/20; G06Q 10/107

USPC ............................................................ 706/11
See application file for complete search history.

(56) References Cited

U.S. PATENT DOCUMENTS

| | | | | |
|---|---|---|---|---|
| 2015/0215253 | A1* | 7/2015 | Vemuri | H04L 51/12 709/206 |
| 2015/0281162 | A1* | 10/2015 | Shen | H04L 51/26 709/206 |
| 2016/0335572 | A1* | 11/2016 | Bennett | G06Q 10/06311 |
| 2016/0337295 | A1* | 11/2016 | Bennett | H04L 51/18 |

OTHER PUBLICATIONS

Spasojevic et al., "Identifying Actionable Messages on Social Media", 2015 IEEE International Conference on Big Data, Oct. 29, 2015. (Year: 2015).*

* cited by examiner

*Primary Examiner* — Dave Misir
(74) *Attorney, Agent, or Firm* — Middleton Reutlinger

(57) ABSTRACT

Methods and apparatus related to generating an original message ask model that can be utilized to determine, based on an original message sent to a user, whether a commit is likely to be present in a yet to be formulated new reply message that is responsive to the original message. In some of those implementations, an indication may be provided for presentation to the user via a computing device of the user in response to determining that a commit is likely to be present in the yet to be formulated new reply message that is responsive to the original message sent to the user.

18 Claims, 8 Drawing Sheets

METHODS AND APPARATUS FOR DETERMINING ORIGINAL ELECTRONIC MESSAGES THAT CONTAIN ASKS

BACKGROUND

Users are often inundated with electronic communications such as emails, chat communications, SMS communications, and social networking communications. Many electronic communications that are sent to a user contain asks (i.e., requests) that explicitly or implicitly solicit the user to reply with a commit (i.e., that the reply actually carry out a particular action and/or contain a pledge to carry out a particular action). For example, an email that contains an ask of "Can you get me the draft presentation by noon" may explicitly solicit a reply that includes an electronic version of "the draft presentation" and/or a reply that contains a pledge that an electronic version of "the draft presentation" will be provided. On the other hand, other electronic communications may not contain asks that solicit the user to reply with a commit. For example, a user may not be expected to reply with a commit to an email that is sent to the user by a sender and that informs the user of the sender's new mailing address.

SUMMARY

Some implementations of this specification are directed generally to methods and apparatus related to generating an original message ask model that can be utilized to determine, based on an original message sent to a user, whether a commit is likely to be present in a yet to be formulated new reply message that is responsive to the original message. In other words, the original message ask model can be utilized to determine, based on an original message sent to a user, whether the original message is likely to contain an ask that can potentially be replied to with a commit.

In some of those implementations, an indication may be provided for presentation to the user via a computing device of the user in response to determining that a commit is likely to be present in the yet to be formulated new reply message that is responsive to the original message sent to the user. For example, the indication may sensorially distinguish the new original message from other "non-ask" messages of the user. For instance, the indication may present the new original message with different visual characteristics than "non-ask" messages (e.g., highlight the new original message, flag the new original message with a graphical element, present the new original message with a different color and/or font), may present the new original message higher than the "non-ask" messages in an ordered list of messages, may present the new original message (and optionally other messages determined to include an ask) without presentation of the "non-ask" messages (e.g., filter out the "non-ask" messages), and/or otherwise sensorially distinguish the new original message. Some additional examples of an indication include presentation of a "to do list" that has been populated with all or aspects of the new original message and/or presentation of a reminder triggered based on all or aspects of the new original message.

Some implementations of this specification are directed to techniques for determining, from electronic communications without human review of the electronic communications, data that can be used to generate and/or refine the original message ask model. For example, some of those implementations are directed to generating positive training examples based on one or more groups of original messages, of a corpus of electronic communications, where those groups of original messages satisfy one or more criteria. For instance, the criteria may include that the original messages of the groups are those replied to by reply messages determined to include a commit. The positive training examples may be utilized to train the original message ask model when the original message ask model is a machine learning model. For instance, each of the positive training examples may include training example input that includes original message features of a corresponding one of the original messages and training example output that indicates an ask is present in the corresponding one of the original messages and/or that a commitment is present in a corresponding reply message.

Some implementations of this specification are additionally and/or alternatively directed to techniques for determining, from electronic communications without human review of the electronic communications, data that can be used to generate and/or refine the reply commit model. In some of those implementations, a version of the original message ask model may be utilized to determine one or more original messages that are likely to have a commit in corresponding reply messages—and those corresponding reply messages utilized to determine data that can be used to refine the reply commit model. For example, positive training examples may be generated based on those corresponding reply messages and utilized to train the reply commit model when the reply commit model is a machine learning model. For instance, each of the positive training examples may include training example input that includes reply message features of a corresponding one of the reply messages and training example output that indicates presence of a commitment.

In various implementations, data used to refine a reply commit model may be determined based on a given version of an original message ask model and the refined reply commit model may then be utilized to determine further data for use in refining the given version of the original message ask model. The refined version of the original message ask model may then be optionally be utilized to determine additional data to further refine the reply commit model—and the further refined reply commit model then utilized to determine yet further data for use in further refining the refined version of the original message ask model. In some of those implementations, this general process may be repeated one or more times to enable appropriate additional data to be determined for continued training and/or otherwise refining the original message ask model.

Some of the implementations described above and disclosed elsewhere herein determine data for generating one or more original message ask models by leveraging the observation that messages that contain asks are often replied to by reply messages that contain commits. Some of those implementations enable generation, without human intervention and while maintaining user privacy, of a quantity of data that enables generation of original message ask models with coverage and/or accuracy that surpasses that of models trained based on a limited quantity of manually labeled data. For example, in some situations it may be difficult or impossible to manually label a quantity of "ask containing" messages that is sufficient to generate one or more models that detect messages that contain "asks" and that do so with desired coverage and/or accuracy. For instance, user privacy and/or cost concerns may make manual labeling of a sufficient quantity of messages difficult or impossible. Various implementations disclosed herein overcome these and/or other drawbacks of solely utilizing manually labeled data.

In some implementations, a method implemented by one or more processors may be provided that includes identifying a corpus of electronic communications stored in one or more databases. A plurality of the electronic communications of the corpus each include a reply message and an original message to which the reply message is responsive. The method further includes identifying, from the corpus of electronic communications, a reply group of the reply messages based on the reply messages of the reply group each being determined to include a commit in a body of the reply message. The method further includes selecting, from the corpus of electronic communications, an original group of the original messages based on the reply messages of the reply group being responsive to the original messages of the original group. The method further includes generating positive training examples based on the original messages of the original group. Each of the positive training examples include training example input based on original message features of a corresponding one of the original messages of the original group and including training example output that indicates presence of the commit. The method further includes: training a machine learning model based on the positive training examples; identifying a given electronic communication of the electronic communications of the corpus based on the original message of the given electronic communication not being included in the original group of the original messages; applying, as input to the trained machine learning model, given message features of the original message of the given electronic communication; and determining, based on output generated over the trained machine learning model based on the input, that the commit is present in the reply message of the given electronic communication that is responsive to the original message of the given electronic communication. The method further includes, based on determining that the commit is present in the reply message of the given electronic communication, using reply message features of the reply message to select an additional reply group of reply messages that each include the commit. The method further includes: selecting an additional original group of the original messages based on the reply messages of the additional reply group being responsive to the original messages of the additional original group; generating additional positive training examples based on the original messages of the additional original group; and further training the machine learning model based on the additional positive training examples.

This method and other implementations of technology disclosed herein may each optionally include one or more of the following features.

In some implementations, the method further includes: identifying a new original message sent to a user; applying, as input to the further trained machine learning model, new original message features of the new original message; and determining, based on output generated over the further trained machine learning model based on the input, that the commit is likely to be present in a yet to be formulated new reply message that is responsive to the new original message. In some of those implementations, the method further includes: in response to determining that the commit is likely to be present in the yet to be formulated new reply message that is responsive to the new original message: providing, for presentation to the user via a computing device of the user, an indication that the commit is likely to be present in the new reply message. In some versions of those implementations, the indication is a visual indication applied to a graphical representation of the new original message. For example, the visual indication may be applied to the graphical representation of the new original message when the new original message is presented along with graphical representations of one or more additional messages, and the graphical representation may visually distinguish the new original message from the one or more additional messages. In some implementations, the indication is provided for presentation to the user in response to the user interacting with the new original message via the computing device of the user.

In some implementations, each of the reply messages of the reply group is determined to include the commit in the body of the reply message based on applying each of the reply messages of the reply group to a trained commit classifier. In some of those implementations, using the reply message features of the reply message to select the additional reply group of the reply messages that each include the commit includes: generating a commit classifier training example based on the reply message features; further training the commit classifier based on the commit classifier training example; and using the further trained commit classifier to select the additional reply group of the reply messages.

In some implementations, the method further includes: determining that the commit is present in a threshold quantity of the reply messages that have the reply message features. In some of those implementations, the threshold quantity includes the reply message and using the reply message features of the reply message to select the additional reply group of reply messages that each include the commit is based on determining that the commit is present in the threshold quantity of the reply messages that have the reply message features.

In some implementations, a method implemented by one or more processors may be provided that includes: identifying a corpus of electronic communications stored in one or more databases. A plurality of the electronic communications of the corpus each include a reply message and an original message to which the reply message is responsive. The method further includes selecting a group of the electronic communications from the corpus of electronic communications based on determining that the electronic communications of the group each have a corresponding original message that satisfies criteria of a model. The method further includes: determining reply message features based on their occurrence in a threshold quantity of the electronic communications of the group; and using the reply message features to select an additional group of the electronic communications based on the electronic communications of the additional group each having a corresponding reply message that includes the reply message features. The method further includes generating refined criteria for the model using original message features from the original messages of the additional group of the electronic communications.

This method and other implementations of technology disclosed herein may each optionally include one or more of the following features.

In some implementations, the method further includes: identifying a new original message sent to a user; determining that the new original message satisfies the refined criteria for the model; and in response to determining that the new original message satisfies the refined criteria for the model: performing one or more further actions directed to the new original message, such as providing, for presentation to the user via a computing device of the user, an indication that sensorially distinguishes the new original message from other messages of the user. In some of those implementations, the indication is a visual indication applied to a graphical representation of the new original message. In some versions of those implementations, the visual indication is applied to the graphical representation of the new original message when the new original message is presented along with graphical representations of one or more additional messages. In some implementations, the indication is provided for presentation to the user in response to the user interacting with the new original message via the computing device of the user.

In some implementations, the model is a machine learning model. In some of those implementations, generating the refined criteria for the model using original message features from the original messages of the additional group of the electronic communications includes: generating a plurality of positive training examples based on the original message features; and generating the refined criteria for the model by training the machine learning model based on the positive training examples.

In some implementations, using the reply message features to select the additional group of the electronic communications based on the electronic communications of the additional group each having a corresponding reply message that includes the reply message features includes: refining a reply message model based on the reply message features; and using the refined reply message model to select the additional group of the electronic communications. In some of those implementations, refining the reply message model includes: generating a plurality of positive training examples based on the reply message features; training the reply message model based on the positive training examples.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
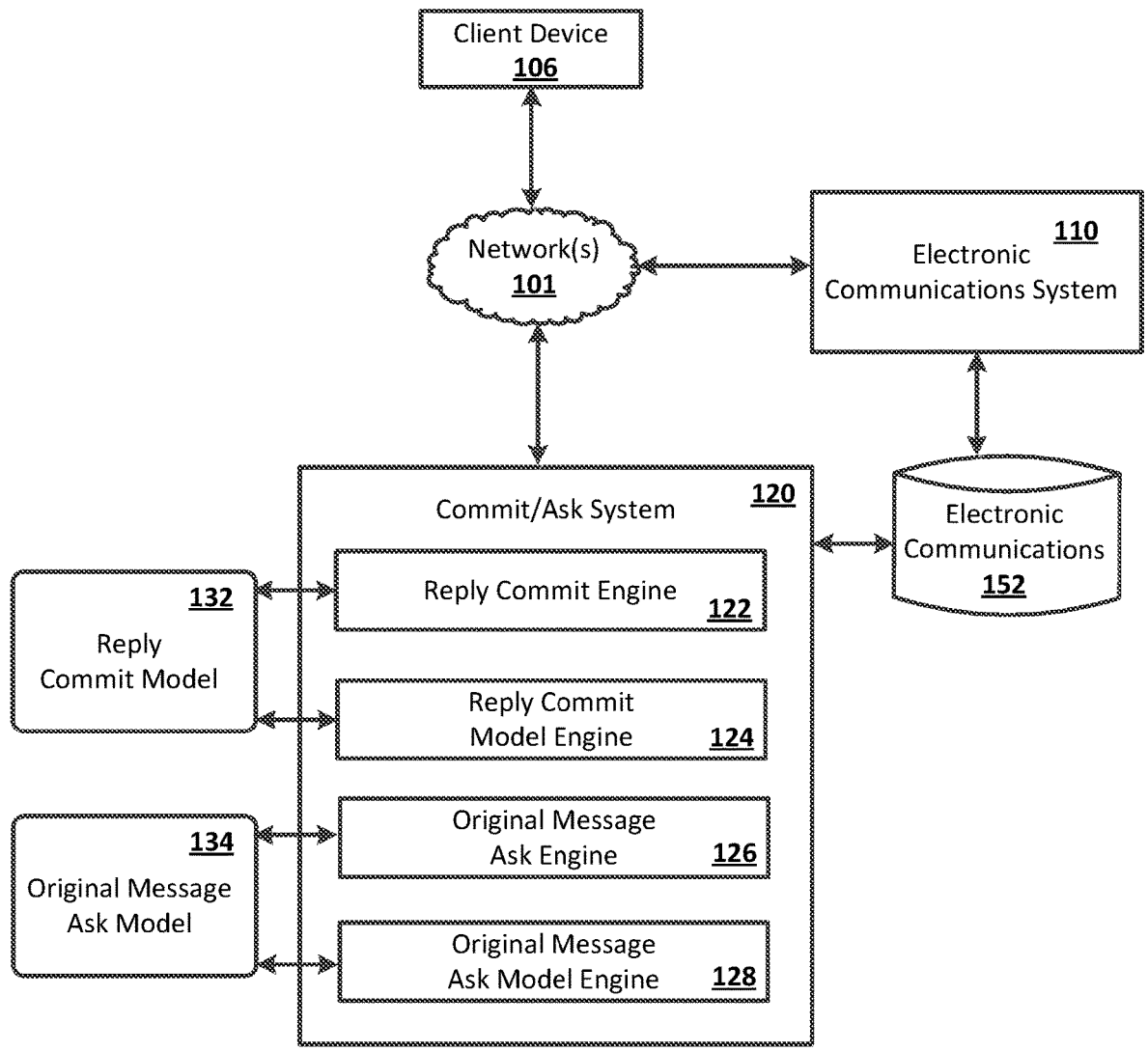
FIG. 1 illustrates an example environment in which implementations disclosed herein may be implemented.

FIG. 1 illustrates an example environment in which implementations disclosed herein may be implemented. The example environment includes a communication network 101 that facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques. The example environment also includes a client device 106, an electronic communications system 110, a commit/ask system 120, at least one reply commit model 132, at least one original message ask model 134, and at least one electronic communications database 152.

Electronic communications system 110 and commit/ask system 120 may each be implemented in one or more computing devices that communicate, for example, through a network (e.g., network 101 and/or other network). Electronic communications system 110, and commit/ask system 120 are example systems in which the systems, components, and techniques described herein may be implemented and/or with which systems, components, and techniques described herein may interface. Electronic communications system 110 and commit/ask system 120 each include one or more memories for storage of data and software applications, one or more processors for accessing data and executing applications, and other components that facilitate communication over a network. In some implementations, and commit/ask system may include one or more components of the example computing device of FIG. 5. In some implementations, one or more aspects of electronic communications system 110 and/or commit/ask system 120 may be combined in a single system and/or one or more aspects may be implemented on the client device 106.

The electronic communications database 152 includes one or more storage mediums that include all, or portions of, electronic communications of a plurality of users. In some implementations, the electronic communications database 152 is maintained by the electronic communications system 110. For example, the electronic communications system 110 may include one or more email systems and the electronic communications database 152 may include a plurality of emails that are sent and/or received via the email systems. As another example, the electronic communications system 110 may include one or more social networking systems, chat systems, SMS systems, and/or other systems, and the electronic communications database 152 may include a plurality of messages, posts, or other communications that are sent and/or received via such systems.

As used herein, an "electronic communication" or "communication" may refer to an email, a text message (e.g., SMS, MMS), an instant message, a chat message, a transcribed voicemail, or any other electronic communication that is transmitted from a computing device of a corresponding user to address(es) or other identifier(s) of a restricted group of one or more additional users. In various implementations, an electronic communication may include various metadata and the metadata may optionally be utilized in one or more techniques described herein. For example, an electronic communication such as an email may include an electronic communication address such as one or more sender identifiers (e.g., sender email addresses), one or more recipient identifiers (e.g., recipient email addresses, including cc'd and bcc'd recipients), a date sent, one or more attachments, a subject, a type of device that sent and/or received the electronic communication, and so forth. An electronic communication may also include a "body" that includes text and/or other content (e.g., image(s), emoji(s)), that is in addition to the metadata, and that may additionally or alternatively be utilized in one or more techniques described herein.

As used herein, "electronic communication" and "communication" will be utilized, depending on the context, to refer to both an electronic communication that includes only an original message and an electronic communication that includes one or more original messages and includes one or more reply messages. An electronic communication may be a single document such as an email that includes both an original message and a reply message and that can be processed to distinguish the original message and the reply message. Processing an electronic communication to distinguish an original message and a reply message may include "splitting" the message based on presence of metadata, message breaks, header information included in the message, quotes provided around the original message, etc. An electronic communication may also be multiple documents that are mapped to one another based on at least one of the multiple documents being responsive to other of the multiple documents. For example, an electronic communication may include a first email that is an original message received by a user and a second email sent by the user as a reply to that original message, original and reply SMS messages, or original and reply chat messages. The mapping of multiple documents to one another may be performed, for example, by the electronic communications system 110. For example, the electronic communications system 110 may map a first email to a second email based on a user selecting a "reply" user interface element when viewing the first email and then drafting the second email responsive to selecting the reply user interface element.

As used herein, an original message is earlier in time to a responsive reply message, but is not necessarily the first message in an electronic communication. For example, an original message may be the first in time message in an electronic communication and a reply message that is responsive to that original message may be a later in time (e.g., the next in time) message. Also, for example, an original message may additionally and/or alternatively be the second, third, or fourth in time message in an electronic communication and a reply message that is responsive to that original message may be a later in time message in the electronic communication. Each of an original message and a reply message may include one or more of associated text, metadata, and/or other content (e.g., attached document(s), link(s) to document(s), image(s), emoji(s)).

In various implementations, commit/ask system 120 may include a reply commit engine 122, a reply commit model engine 124, an original message ask engine 126, and an original message ask model engine 128. In some implementations, all or aspects of engines 122, 124, 126, and/or 128 may be omitted, combined, and/or implemented in a component that is separate from commit ask system 120 (e.g., client device 106 and/or electronic communications system 110).

The reply commit engine 122 utilizes the reply commit model 132 to determine reply messages, of electronic communications of database 152, that are likely to include a commit. As used herein, a "commit" may refer to text, image(s), attachment(s), and/or other content of a reply message that indicates the reply message actually carries out a particular action that is responsive to a corresponding original message and/or that indicates a pledge to carry out a particular action that is responsive to a corresponding original message.

As one example, in some implementations reply commit model 132 may be a trained machine learning model, and the reply commit engine 122 may: apply reply message features of the reply message as input to the trained machine learning model, generate output over the model based on the applied input, and utilize the generated output to determine whether the reply message contains a commit. For instance, the output may be binary output (i.e., either a first value or a second value) and the reply commit engine 122 may determine a commit is present if the output is a first value and may determine the commit is not present if the output is a second value. Also, for instance, the output may be non-binary output (e.g., a range of values such as a range of values between 0 and 1) and the reply commit engine 122 may determine a commit is present if the output satisfies a threshold (e.g., is greater than 0.6). Various reply message features may be utilized such as text features of text in a body of the reply message. Text features may include, for example, individual terms, stemmed versions of individual term(s), a plurality of terms (optionally ordered), annotation(s) of term(s) (e.g., a sense of a term, a class of a term, a grammatical label applied to a term and/or group of terms), a word count of terms, a character count of term(s), etc. Additional and/or alternative reply message features may be utilized such as features of image(s) and/or other content included in a body of the reply message, metadata features of the reply message (e.g., features from a subject of the reply message, a quantity of recipients of the reply message), etc. A class of a term may be, for example, an indication of multiple terms that have similar semantic meaning, such as a class of "requesting verbs" such as "provide", "send", "include", "can", "attach", etc.

In implementations where a utilized reply commit model 132 is a trained classifier or other trained machine learning model, it may optionally be initially trained by the reply commit model engine 124 utilizing manually labeled training examples. For example, the training examples may each include training example input of one or more reply message features and training example output indicating whether (or a likelihood that) the reply message features are indicative of a commit. The reply commit model engine 124 may initially train the reply commit model 132 based on application of the training example input of the manually labeled training examples and backpropagation based on the training example output of the manually labeled training examples. As described in detail herein, the reply commit model engine 124 may further refine the reply commit model 132 by further training the reply commit model 132 based on further training examples determined via utilization of one or more versions of the original message ask model 134.

As another example, in some implementations reply commit model 132 may be a model that explicitly indicates various reply message features that constitute a commit. For instance, the reply commit model 132 may include explicit phrases that each constitute a commit (e.g., "yes, I will attend", "I will be in attendance"), explicit templates that each constitute a commit (e.g., "[yes/sure/yeah] I will [attend/be in attendance/be there])", explicit groupings (optionally ordered) of terms that each constitute a commit, etc. Additional and/or alternative reply message features may be utilized such as features of image(s) and/or other content included in a body of the reply message, metadata features of the reply message, etc. The reply commit engine 122 may determine whether reply message features of a reply message conform to one or more of the explicitly indicated reply message features of the reply commit model 132 and determine whether the reply message contains a commit based on such a determination.

In implementations where a utilized reply commit model 132 is a model that explicitly indicates various reply message features that constitute a commit, it may be initially generated by the reply commit model engine 124 utilizing manually labeled explicit reply message features. As described in detail herein, the reply commit model engine 124 may further refine the reply commit model 132 by further adding additional reply message features that constitute a commit based on further data determined via utilization of one or more versions of the original message ask model(s) 134.

As will be understood with reference to this specification, what is deemed by the reply commit engine 122 to be a commit may be dependent on the initial configuration of the reply commit model 132 utilized by the reply commit engine 122 and/or subsequent refinement(s) of the reply commit model 132 by the reply commit model engine 124. In various implementations, multiple reply commit models 132 may be provided, with each being configured for utilization in determining a different semantic type of commit. For example, a first reply commit model 132 may be configured to determine a commit related to attending an event, a second reply commit model 132 may be configured to determine a commit related to providing an electronic document (e.g., any electronic document or a certain type of electronic document such as an image, a spreadsheet), etc. In some of those various implementations, each of the multiple reply commit models 132 may optionally be utilized to determine training examples and/or other data for generating and/or training a corresponding one of multiple original message ask models 134.

The reply commit engine 122 provides an indication of the reply messages of electronic communications determined to contain a commit to the original message ask model engine 128. The original message ask model engine 128 selects original messages to which those reply messages are responsive, and utilizes original message features of the original messages to generate and/or refine the original message ask model 134.

As one example, in some implementations original message ask model 134 may be a trained machine learning model, and the original message ask model engine 128 may generate a plurality of positive training examples based on the original messages to which the reply messages provided by reply commit engine 122 are responsive. For example, the positive training examples may each include training example input of one or more original message features of a corresponding original message and training example output indicating that the original message features are indicative of an ask (i.e., an ask that solicits a commit be provided in a reply message). The original message ask model engine 128 may train the original message ask model 134 based on application of the training example input of the training examples and backpropagation based on the training example output of the training examples.

In some implementations, the original message ask model 134 may generate training examples based on a subset of such original messages, such as a subset that satisfies one or more criteria. The criteria may include, for example, a body, a subject, and/or other portion(s) of each of the messages being less than a threshold word count of terms and/or less than a threshold character count of term(s). Various original message features may be utilized such as text features of text in a body of the original message. Additional and/or alternative original message features may be utilized such as features of image(s) and/or other content included in a body of the original message, metadata features of the original message, etc. In some implementations, training example output generated by the original message ask model engine 128 may be binary (e.g., either a first value indicating an ask or a second value indicating not an ask). In some other implementations, the training example output may be non-binary. In some of those other implementations, the value of a given non-binary training example output may be based on output from the reply commit engine 122 for a corresponding reply message. For example, for a given training example based on a given original message to which a given reply message is responsive, the value may be based on a non-binary likelihood that the given reply message contains a commit, as determined by reply commit engine 122.

As described in detail herein, the original message ask model engine 128 may further refine the original message ask model 134 by further training the original message ask model 134 based on further training examples determined via utilization of one or more refined versions of the reply commit model 132. As also described in detail herein, the refined version(s) of the reply commit model 132 may be refined based on further data determined via utilization of one or more version of the original message ask model 134.

As another example, in some implementations original message ask model 134 may be a model that explicitly indicates various original message features that constitute an ask. For instance, the original message ask model 134 may include explicit phrases that each constitute an ask (e.g., "Are you going to be at today's meeting?", "Will you be at the meeting?"), explicit templates that each constitute an ask (e.g., "[Are you/Will you] [ ] [attend/attending/going to be at] [ ] meeting)", explicit groupings (optionally ordered) of terms that each constitute an ask, etc. Additional and/or alternative original message features may be utilized such as features of image(s) and/or other content included in a body of the original message, metadata features of the original message, etc.

In implementations where the original message ask model 134 is a model that explicitly indicates various original message features that constitute an ask, it may be generated by the original message ask model engine 128 based on those original message features being present in one or more original messages to which the reply messages indicated by reply commit engine 122 are responsive. For example, an original message feature may be added by the original message ask model engine 128 based on that original message feature occurring in at least a threshold quantity of such original messages. As described in detail herein, the original message ask model engine 128 may further refine the original message ask model 134 based on further original messages determined, via utilization of one or more refined versions of the reply commit model 132, to have a reply message that include a commit. As also described in detail herein, the refined version(s) of the reply commit model 132 may be refined based on further data determined via utilization of one or more version of the original message ask model 134.

The original message ask engine 126 utilizes the original message ask model 134 to determine original messages that are likely to include an ask.

For example, in implementations where the original message ask model 134 is a trained classifier or other trained machine learning model, the original message ask engine 126 may: apply original message features of the original message as input to the trained machine learning model, generate output over the model based on the applied input, and utilize the generated output to determine whether the original message contains an ask. For instance, the output may be binary output (i.e., either a first value or a second value) and the original message ask engine 126 may determine an ask is present if the output is a first value and may determine that an ask is not present if the output is a second value. Also, for instance, the output may be non-binary output (e.g., a range of values such as a range of values between 0 and 1) and the original message ask engine 126 may determine an ask is present if the output satisfies a threshold (e.g., is greater than 0.6).

Also, for example, in implementations where the original message ask model 134 is a model that explicitly indicates various original message features that constitute an ask, the original message ask engine 126 may: determine whether original message features of an original message conform to one or more of the explicitly indicated original message features of the original message ask model 134 and determine whether the original message contains a commit based on such a determination.

In some implementations, the original message ask engine 126 determines whether a yet to be replied to original message is likely to include an ask. In some of those implementations, the original message ask engine 126 (directly or via the electronic communications system 110 and/or the client device 106) may provide an indication for presentation to one or more recipients via their respective computing devices. In some versions of those implementations, the indication sensorially distinguishes the original message from other messages of the user(s). For example, for an original message sent to a user of the client device 106, the indication may be provided for presentation to the user via the client device 106. Some examples are provided in FIGS. 4A-4D and described in more detail herein.

In some implementations, the original message ask engine 126 determines whether an already replied to original message is likely to include an ask. As described in more detail herein, a reply message that is a reply to that original message may then be utilized by the reply commit model engine 124 to refine the reply commit model 132 (e.g., under the assumption that the reply message includes a responsive commit).

Although particular examples of message features are provided above, additional and/or alternative message features may be utilized by one or more of the engines 122, 124, 126, and/or 128. For instance, one or more message features may include: features based on one or more natural language processing tags or other labels applied to text (e.g., parts of speech, named entities, entity types, tone); features based on text that occurs specifically in the subjects, the first sentences, the last sentences, or other location(s); features based a time the electronic communication was sent, day of the week the electronic communication was sent, a type of device that sent the electronic communication, etc.; and/or an embedding vector of one or more features from the entire electronic communication or a subset of the electronic communication (e.g., one or more paragraphs, one or more sentences, one or more words).

Figure 2A:
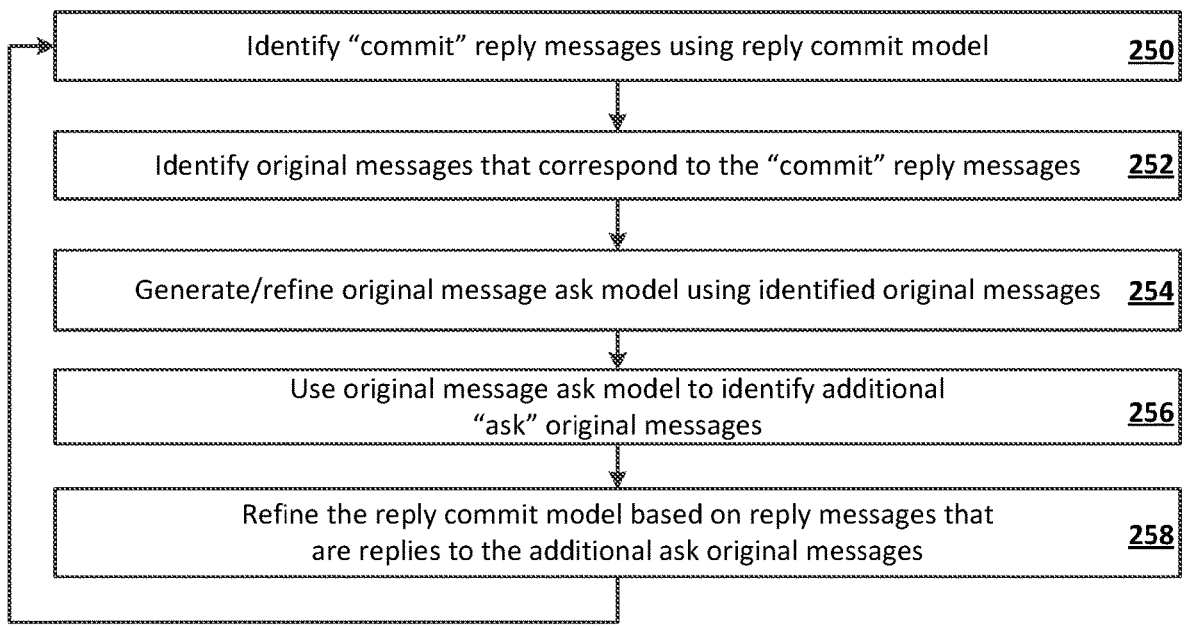
FIG. 2A is a flow chart illustrating an example method that includes generating and/or refining an original message ask model and refining a reply commit model.

Turning now to FIGS. 2A-2D, additional description of various components of FIG. 1 is provided. FIG. 2A is a flow chart illustrating an example method that includes generating and/or refining an original message ask model and refining a reply commit model. For convenience, the operations of the flow chart are described with reference to a system that performs the operations. This system may include various components of various computer systems. For instance, some operations may be performed by one or more components of the commit/ask system 120, such as engines 122, 124, 126, and/or 128. Moreover, while operations of the method of FIG. 2A are shown in a particular order, this is not meant to be limiting. One or more operations may be reordered, omitted or added.

At block 250, the system identifies commit reply messages using a reply commit model. For example, the reply commit engine 122 may utilize the reply commit model 132 to identify, from electronic communications database 152, a group of the electronic communications that each include reply messages that have a commit. The reply commit model utilized by the system may be a trained classifier or other trained machine learning model, and/or it may be a model that explicitly indicates various reply message features that constitute a commit. In some implementations, in an initial iteration of block 250 the reply commit model 132 may optionally be based on only manually labeled training examples and/or other manually curated data.

In some implementations, in identifying commit reply messages present in electronic communications of a corpus, the system may analyze all of the electronic communications of the corpus that include a reply message. In some other implementations, the system may analyze only a subset of the electronic communications, such as a subset that satisfies one or more criteria. For example, the system may only analyze electronic communications that are temporally recent, that have been "read" by a recipient, that satisfy certain character count and/or term count requirements, that are associated with a particular geographic region, that are unlikely to be spam, and/or that satisfy one or more other criteria.

At block 252, the system identifies original messages that correspond to the commit reply messages identified at block 250. For example, the original message ask model engine 128 may identify a group of the original messages to which the commit reply messages identified at block 250 are responsive. In some implementations, the system identifies all original messages that correspond to the commit reply messages identified at block 250. In some other implementations, the system may identify only a subset of such original messages, such as a subset of original messages that each satisfy one or more criteria.

At block 254, the system generates or refines an original message ask model using the identified original messages. The original message ask model may be a classifier or other machine learning model, and/or it may be a model that explicitly indicates various original message features that constitute an ask. In some implementations, in a first iteration of block 254 the system generates the original message ask model and in subsequent iterations of block 254 the system refines the original message ask model. In some other implementations, the system may refine an already generated original message ask model in the first iteration.

Figure 2B:
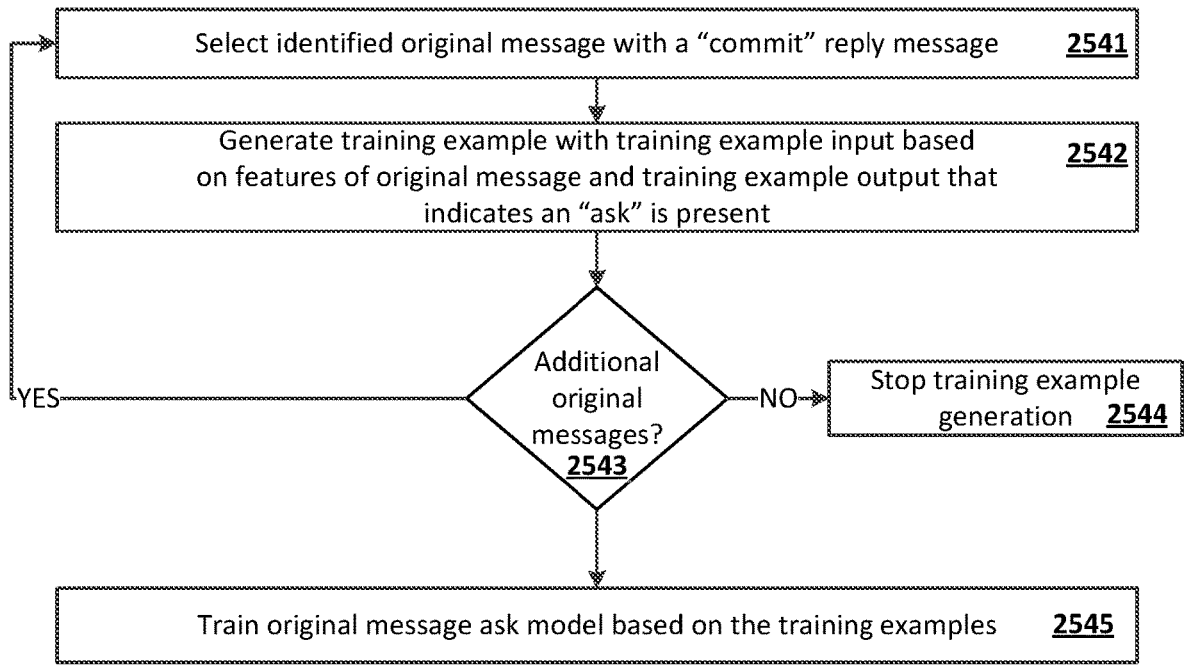
FIG. 2B is a flow chart illustrating one example of generating and/or refining an original message ask model.
Figure 2C:
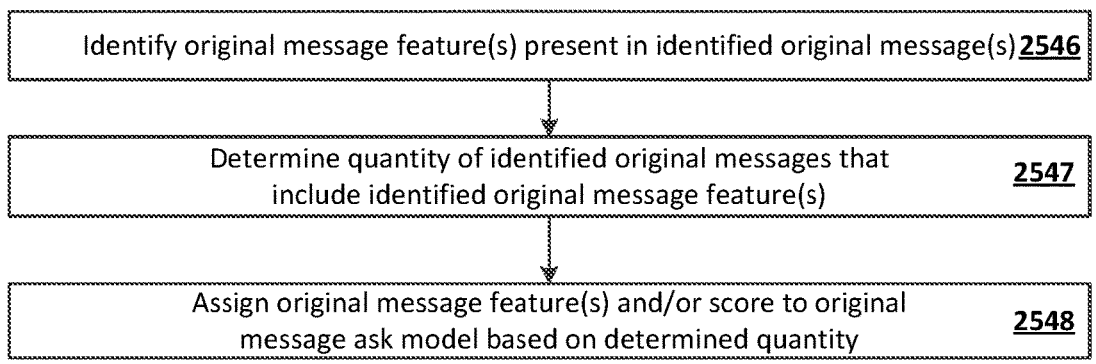
FIG. 2C is a flow chart illustrating another example of generating and/or refining an original message ask model.

In some implementations, in performing block 254 the system performs one or more of the blocks of FIG. 2B and/or one or more of the blocks of FIG. 2C. FIGS. 2B and 2C are described in more detail below.

At block 256, the system uses the original message ask model to identify additional ask original messages. For example, the original message ask engine 126 may utilize the original message ask model generated or refined in block 254 to identify, from electronic communications database 152, a group of the electronic communications that each include an original message that has an ask and that each include a reply message. In some implementations, the original message ask engine 126 may select original messages for analysis and/or inclusion in the group based on those original messages having not been previously identified in a prior iteration of block 252. In other words, the original message ask engine 126 may select original messages that are in addition to those that correspond to reply messages determined in prior iteration(s) of block of 250 as containing a commit.

Figure 2D:
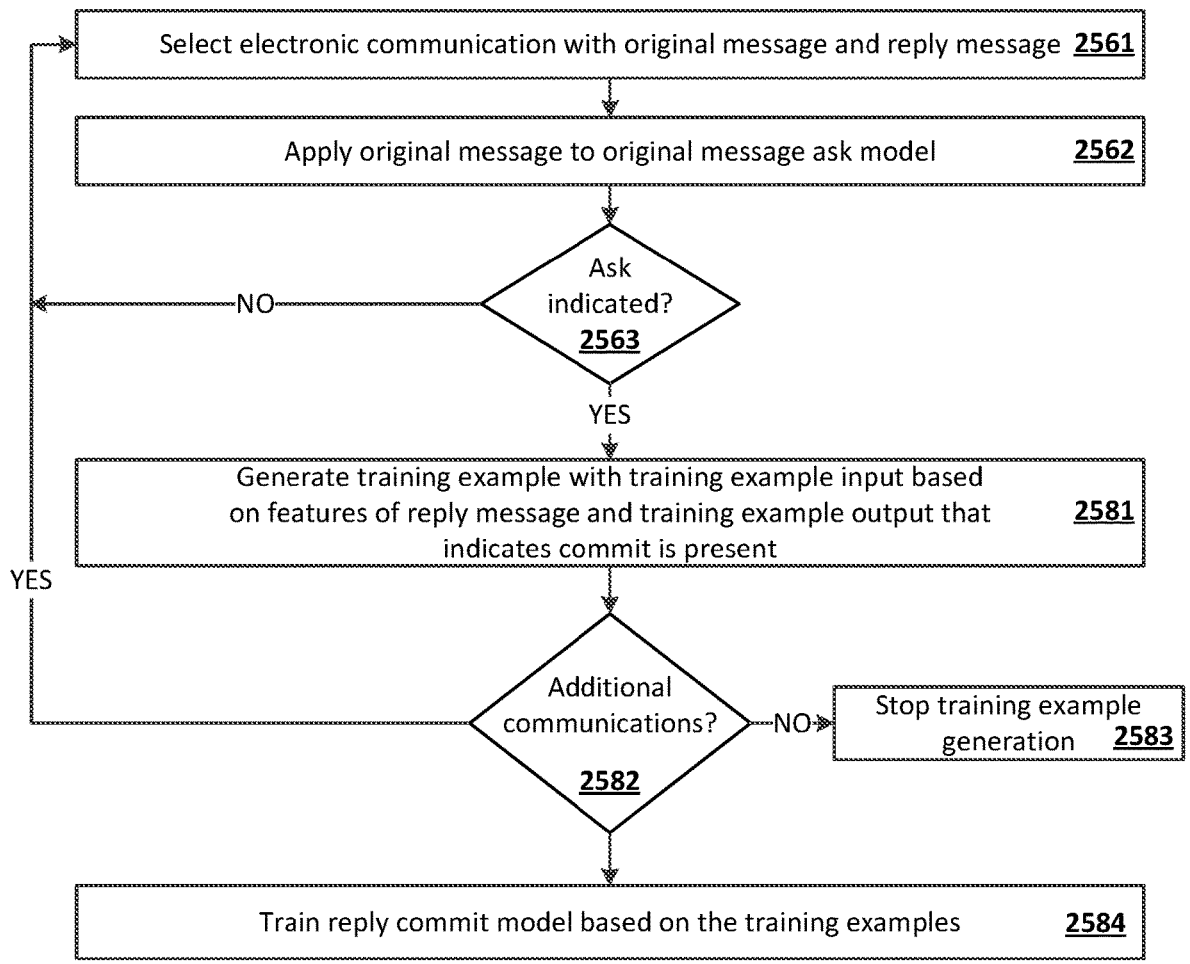
FIG. 2D is a flow chart illustrating an example of using an original message ask model to identify additional ask original messages and refining a reply commit model based on reply messages that are replies to the additional ask original messages.
Figure 2E:
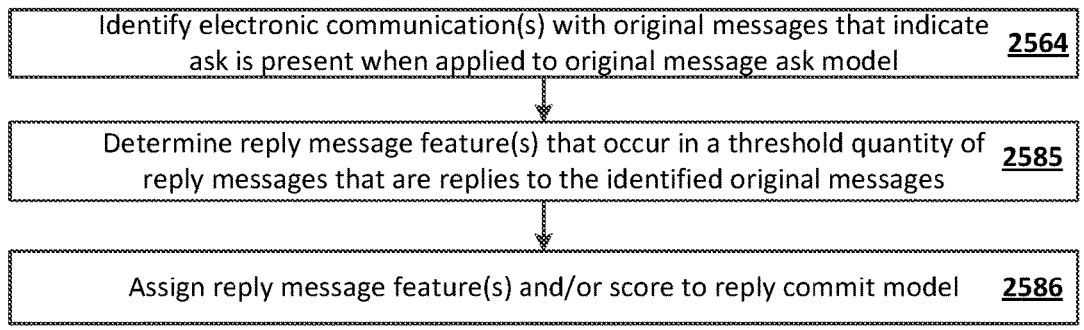
FIG. 2E is a flow chart illustrating another example of using an original message commit model to identify additional ask original messages and refining a reply commit model based on reply messages that are replies to the additional ask original messages.

In some implementations, in performing block 256 the system performs blocks 2561, 2562, and 2563 of FIG. 2D and/or block 2564 of FIG. 2E. FIGS. 2D and 2E are described in more detail below.

At block 258, the system refines the reply commit model based on reply messages that are replies to the additional ask original messages identified at block 256. As described with respect to block 256, one or more (e.g., all) such reply messages may have not been identified in prior iteration(s) of block 250, which may mean they were not deemed to include a commit based on prior version(s) of the reply commit model. By using such reply messages to refine the reply commit model, the reply commit model may subsequently be utilized to identify such reply messages (and similar reply messages), thereby expanding its functionality and enabling identification of yet further original messages that may be utilized in refining the original message ask model in future iterations of block 254.

In some implementations, in performing block 258 the system performs blocks 2581-2584 of FIG. 2D and/or blocks 2585 and 2586 of FIG. 2E. FIGS. 2D and 2E are described in more detail below.

Following block 258, the system then returns to block 250 and identifies additional commit reply messages using the refined reply commit model (refined at block 258). For example, the system may identify additional commit reply messages that were not previously identified in one or more prior iterations of block 250. The system may be able to identify such additional commit reply messages based on the refinement to the reply commit model that occurred in the preceding iteration of block 258.

At the next iteration of block 252, the system identifies additional original messages that correspond to the additional commit reply messages of block 258. The additional original messages may include, or be restricted to, ones that were not previously identified in one or more prior iterations of block 252 (as a result of the additional commit reply messages of block 258 having not been previously identified).

At the next iteration of block 254, the system refines the original ask model using the additional identified original messages of the most recent iteration of block 252. As the additional identified original messages include ones not previously identified, such refinement may expand the functionality of the original ask model for another iteration of block 256 and/or for use in the method of FIG. 3.

The system may then optionally perform another iteration of blocks 256 and 258, optionally followed by one or more additional iterations of block 250, 252, 254, 256, and/or 258. Through multiple iterations of the method of FIG. 2A, the reply commit model may continue to be refined using data derived from a most recent version of the original message ask model, which may continue to be refined using data derived from a most recent version of the reply commit model. Such an iterative process may result in expanded functionality of both models.

FIG. 2B is a flow chart illustrating one example of generating and/or refining the original message ask model. For convenience, the operations of the flow chart are described with reference to a system that performs the operations. This system may include various components of various computer systems. For instance, some operations may be performed by one or more components of the commit/ask system 120, such as original message ask model engine 128. Moreover, while operations of the method of FIG. 2B are shown in a particular order, this is not meant to be limiting. One or more operations may be reordered, omitted or added.

In some implementations, the method of FIG. 2B may be performed at block 254 of the method of FIG. 2A. For example, the method of FIG. 2B may be performed when the original message ask model of FIG. 2A is a machine learning model.

At block 2541, the system selects an identified original message to which a commit reply message is responsive. For example, the system may select one of the identified original messages of block 252 of FIG. 2A.

At block 2542, the system generates a training example with training example input based on original message features of the original message and training example output that indicates an ask is present.

At block 2543, the system determines if there are additional original messages to process. If so, the system returns to block 2541 to select an additional identified original message, and at block 2542 generates another training example based on features of the selected additional identified original message.

If the system determines at block 2453 that there are not additional original messages to process, the system stops the training example generation at block 2544.

At block 2545 the system trains the original message ask model based on the training examples generated in multiple iterations of blocks 2541 and 2542. In some implementations, block 2545 may be performed after block 25444. In some other implementations, block 2545 may be performed on already generated training examples while additional training examples are still being generated. In some implementations, the system may also optionally generate, (and train the original message ask model based on) "negative" training examples in addition to the "positive" training examples generated in multiple iterations of blocks 2541 and 2542. For example, the system may identify other electronic communications that include an original message and corresponding reply message(s), where the corresponding reply message(s) were not determined to include a commit. Negative training examples may be generated with each having training example input based on original message features of a corresponding one of those original messages and training example output that indicates a commit is not present.

FIG. 2C is a flow chart illustrating another example of generating and/or refining the original message ask model. For convenience, the operations of the flow chart are described with reference to a system that performs the operations. This system may include various components of various computer systems. For instance, some operations may be performed by one or more components of the commit/ask system 120, such as original message ask model engine 128. Moreover, while operations of the method of FIG. 2C are shown in a particular order, this is not meant to be limiting. One or more operations may be reordered, omitted or added.

In some implementations, the method of FIG. 2C may be performed at block 254 of the method of FIG. 2A. For example, the method of FIG. 2C may be performed when the original message ask model of FIG. 2A is a model that explicitly indicates various original message features that constitute an ask.

At block 2546, the system identifies one or more original message features that are present in identified original message to which a commit reply message is responsive. For example, the system may identify an original message feature based on it being present in one of the identified original messages of block 252 of FIG. 2A.

At block 2547, the system determines a quantity of the identified original messages that include the original message feature(s) identified at block 2546.

At block 2548, the system assigns the identified original message feature(s) and/or a score to the original message ask model based on the quantity determined at block 2547. For example, the system may assign the identified original message feature in response to determining the quantity satisfies a threshold. Also, for example, the system may additionally and/or alternatively assign a score to the original message feature in the model based on the quantity. For example, if the quantity is relatively high the system may assign a score that is more indicative of an ask than it would be if the quantity was relatively low.

In some implementations, the system compares the quantity of block 2547 to an additional quantity of other original messages. The additional quantity of other original messages may be, for example, all other original messages (not included in those of block 2547) that include a responsive reply message; or all other original messages (not included in those of block 2547) that do not include any reply message and/or that do not include a reply message determined to include a "commit". In some of those implementations, the system may assign the identified original message feature(s) and/or determine the score based on the comparison. Generally, such a comparison may provide an indication as to whether the original message features are those truly indicative of an ask vs. those that also occur frequently in other original messages that are not indicative of an ask. For example, if the quantity of identified original messages identified at block 2547 is 1,000 and it is determined that the original message feature(s) only occurs in 100 "other" original messages, the original message features may be highly indicative of an ask and assigned to the original message ask model and/or scored accordingly. If, on the other hand, the quantity of identified original messages identified at block 2547 is 1,000 and it is determined that the original message feature(s) occurs in 5,000 "other" original messages, the original message features may not be indicative of an ask and not assigned to the original message ask model and/or scored accordingly.

Blocks 2546-2547 may be repeated multiple times to assign multiple message features and/or corresponding scores to the original message ask model based on original messages identified in a given iteration of block 252 of FIG. 2A.

FIG. 2D is a flow chart illustrating an example of using an original message ask model to identify additional ask original messages and refining a reply commit model based on reply messages that are replies to the additional ask original messages. For convenience, the operations of the flow chart are described with reference to a system that performs the operations. This system may include various components of various computer systems. For instance, some operations may be performed by one or more components of the commit/ask system 120, such as original message ask engine 126 and reply commit model engine 124. Moreover, while operations of the method of FIG. 2D are shown in a particular order, this is not meant to be limiting. One or more operations may be reordered, omitted or added.

In some implementations, blocks 2561-2563 of the method of FIG. 2D may be performed at block 256 of the method of FIG. 2A and blocks 2581-2584 of the method of FIG. 2D may be performed at block 258 of the method of FIG. 2A. For example, the method of FIG. 2D may be performed when the reply commit model of FIG. 2A is a machine learning model.

At block 2561, the system selects an electronic communication with an original message and a reply message.

At block 2562, the system applies the original message to the original message ask model. For example, the system may apply original message features of the original message to the original message ask model.

At block 2563, the system determines whether output generated over the original message ask model based on the application of block 2562 indicates an ask. If not, the system proceeds back to block 2561 and selects another electronic communication. If so, the system proceeds to block 2581.

At block 2581, the system generates a training example with training example input that is based on reply message features of the reply message of the electronic communication selected at block 2561 and training example output that indicates a commit is present.

At block 2582, the system determines if there are additional communications to process. If so, the system returns to block 2561 to select an additional electronic communication, and optionally generate an additional training example based on the additional electronic communication (i.e., if an ask is determined to be indicated at block 2563).

If the system determines at block 2582 that there are not additional original messages to process, the system stops the training example generation at block 2583.

At block 2584 the system trains the reply commit model based on the training examples generated in multiple iterations of blocks 2581. In some implementations, block 2584 may be performed after block 2583. In some other implementations, block 2584 may be performed on already generated training examples while additional training examples are still being generated.

FIG. 2E is a flow chart illustrating another example of using an original message commit model to identify additional ask original messages and refining a reply commit model based on reply messages that are replies to the additional ask original messages. For convenience, the operations of the flow chart are described with reference to a system that performs the operations. This system may include various components of various computer systems. For instance, some operations may be performed by one or more components of the commit/ask system 120, such as original message ask engine 126 and reply commit model engine 124. Moreover, while operations of the method of FIG. 2E are shown in a particular order, this is not meant to be limiting. One or more operations may be reordered, omitted or added.

In some implementations, block 2564 of the method of FIG. 2E may be performed at block 256 of the method of FIG. 2A and blocks 2585-2586 of the method of FIG. 2E may be performed at block 258 of the method of FIG. 2A. For example, the method of FIG. 2E may be performed when the reply commit model of FIG. 2A explicitly indicates various reply message features that constitute a commit.

At block 2564, the system identifies electronic communications with original messages that indicate an ask is present when those original messages are applied to an original message ask model. For example, the original message ask engine 126 may apply an original message to the original message ask model 134 and identify that original message as including an ask if the application indicates the original message contains an ask.

At block 2585, the system determines reply message feature(s) that occur in a threshold quantity of reply messages that are replies to the original messages identified at block 2564.

At block 2586 the system assigns the reply message feature(s) and/or a score to the reply commit model. For example, the system may assign the identified reply message feature(s) in response to determining the reply message feature(s) occur in at least the threshold quantity of reply messages. Also, for example, the system may additionally and/or alternatively assign a score to the reply message feature(s) in the model based on the quantity of reply messages in which the reply message feature(s) occur. For example, if the quantity is relatively high the system may assign a score that is more indicative of a commit than it would be if the quantity was relatively low.

Blocks 2564, 2585, and 2586 may be repeated multiple times to assign multiple reply message features and/or corresponding scores to the reply commit model based on multiple identified reply messages.

Figure 3:
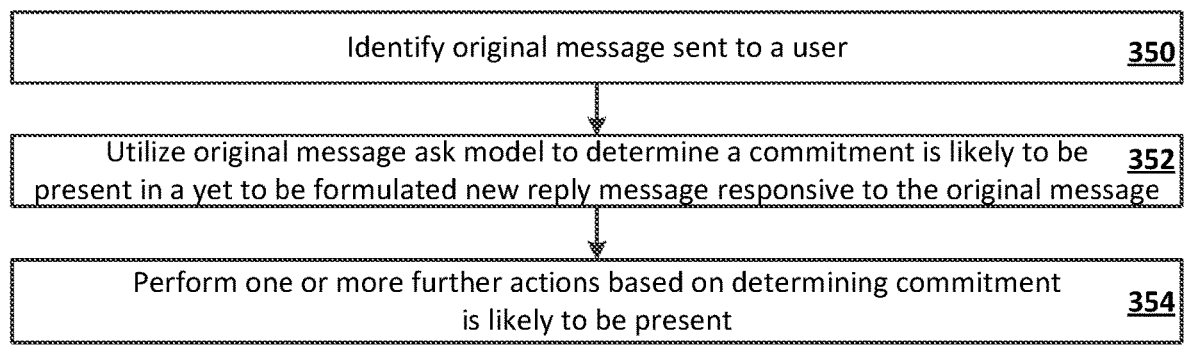
FIG. 3 is a flow chart illustrating an example of using an original message ask model to determine that an original message is likely to be replied to with a commit reply message, and performing one or more further actions based on such a determination.

FIG. 3 is a flow chart illustrating an example of using an original message ask model to determine that an original message is likely to be replied to with a commit reply message, and performing one or more further actions based on such a determination. For convenience, the operations of the flow chart are described with reference to a system that performs the operations. This system may include various components of various computer systems. For instance, some operations may be performed by one or more components of the commit/ask system 120, such as original message ask engine 126. Moreover, while operations of the method of FIG. 3 are shown in a particular order, this is not meant to be limiting. One or more operations may be reordered, omitted or added.

At block 350, the system identifies an original message sent to a user.

At block 352, the system utilizes an original message ask model to determine a commitment is likely to be present in a yet to be formulated new reply message that is responsive to the original message identified at block 350. The original message ask model may be, for example, one generated and/or refined through one or more iterations of the method of FIG. 2A.

For example, in implementations where the original message ask model is a trained classifier or other trained machine learning model, the system may: apply original message features of the original message as input to the trained machine learning model, generate output over the model based on the applied input, and utilize the generated output to determine that the original message is likely to contain an ask. For instance, the output may be binary output and the system may determine an ask is present if the output is a certain value. Also, for instance, the output may be non-binary output and the system may determine an ask is present if the output satisfies a threshold. Also, for example, in implementations where the original message ask model is a model that explicitly indicates various original message features that constitute an ask, the system may: determine that original message features of an original message conform to one or more of the explicitly indicated original message features of the original message ask model and determine that the original message contains a commit based on such a determination.

At block 354, the system performs one or more further actions based on determining the commitment is likely to be present in the original message identified at block 350. For example, the system may provide an indication for presentation to the user, via a respective computing device, where the indication sensorially distinguishes the original message from other messages of the user(s). For instance, the indication may be a flag, star, and/or other graphical indicia applied to a graphical representation of the original message. Also, for instance, the indication may be a sound and/or haptic feedback generated when the user interacts with a graphical representation of the original message. Also, for instance, the indication may additionally and/or alternatively be presenting the original message higher, in an ordered list of messages, than it would otherwise be had it not been determined to likely include an ask. Also, for instance, the indication may additionally and/or alternatively be assigned to a different visually separate folder (e.g., a "high priority folder"). Also, for instance, the indication may additionally and/or alternatively be presenting a graphical representation of the original message larger, with different font, and/or in a different color than other original messages not determined to include an ask.

In some implementations, which of multiple available indications is provided and/or actions is performed may be dependent on how strongly the original message ask model indicates the ask is present in the original message. For example, the original message ask model may be a trained machine learning model and non-binary output may be generated over the model based on application, as input to the model, of original message features of the original message. The non-binary output may indicate how likely it is that the original message includes an ask. If the output indicates it is very likely that the original message includes an ask, one or more first indications may be provided—whereas if the output indicates it is only slightly likely that the original message includes an ask, one or more separate second indications may be provided.

As additional examples of one or more further actions the system may additionally or alternatively perform at block 354, the system may: populate a "to do list" with all or aspects of the original message, generate a "reminder" based on all or aspects of the original message, populate a calendar entry based on all or aspects of the original message, and/or perform other action based on the original message. As another example, the system may provide all or aspects of the original message to one or more other computer applications and/or other component(s) for further processing (e.g., the other component(s) may populate a "to do list" based on the original message).

FIGS. 4A-4D illustrate some example graphical user interfaces for providing an indication that a commitment is likely to be present in a yet to be formulated reply message that is responsive to an original message. The example graphical user interfaces may be presented to a recipient of the original message through a computing device of the recipient, such as client device 106 of FIG. 1. The graphical user interfaces of FIGS. 4A-4D may be presented with indications in response to original message ask engine 126 determining, based on original message ask model 134, that one or more corresponding original messages are likely to include an ask. In some implementations, the original message ask engine 126 and/or the original message ask model 134 may be in communication with and/or implemented (at least in part by) electronic communications system 110 and electronic communications system may provide data to enable the generation of one or more aspects of the graphical interfaces and/or the indications. In some of those implementations, the electronic communications system 110 may be implemented, in whole or in part, by the client device 106.

Figure 4A:
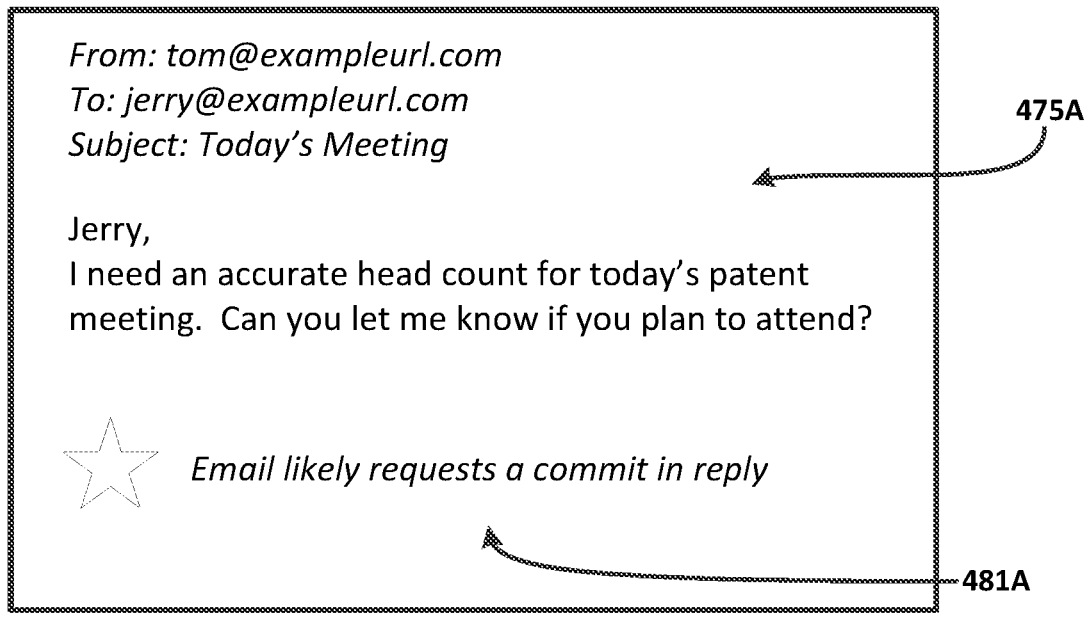
FIGS. 4A, 4B, 4C, and 4D illustrate example graphical user interfaces for providing an indication that a commitment is likely to be present in a yet to be formulated reply message that is responsive to an original message.

In FIG. 4A, an original email 475A that has been sent to a user is being viewed by the user, optionally before the user has provided any user interface input to indicate a desire to reply to the original email 475A. In response to determining that the original email 475A likely includes an ask, an indication 481A is provided that includes a "star" and a textual indication that the original email 475A likely requests a commit be provided in a reply message that is responsive to the original email 475A.

Figure 4B:
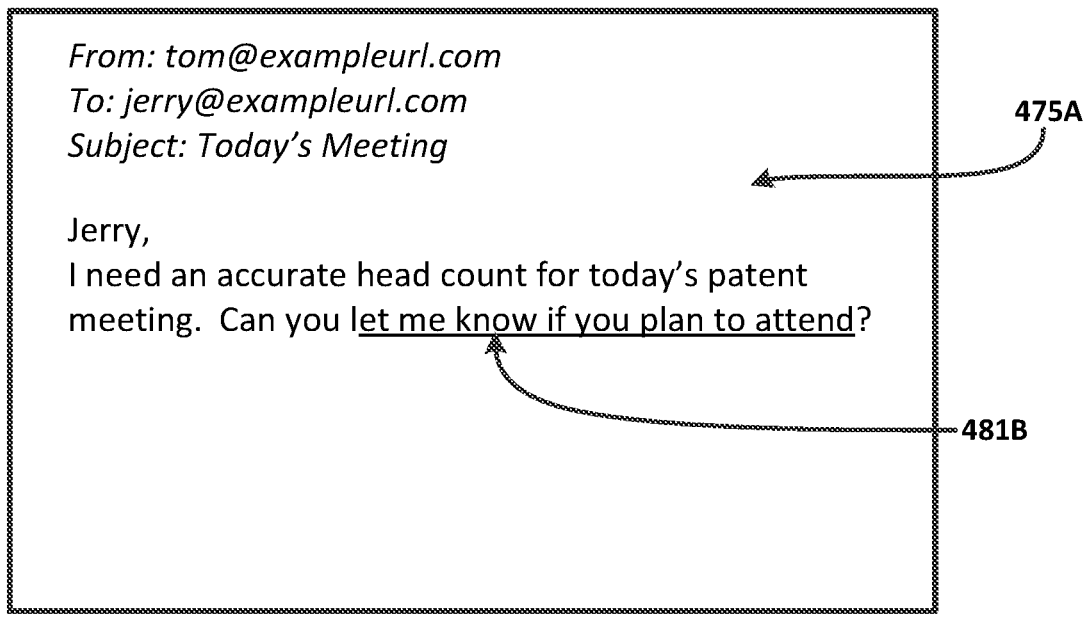

FIG. 4B displays the same original email 475A as FIG. 4A. However, in FIG. 4A an indication 481B is provided in lieu of the indication 481A of FIG. 4A. The indication 481B is an underlining of certain text in the original email 475A, where that text indicates the ask that is included in the original email 475A. In some implementations, the text may be selected for underlining based on it conforming to text explicitly indicated in an original email ask model as text that indicates an ask.

Figure 4C:
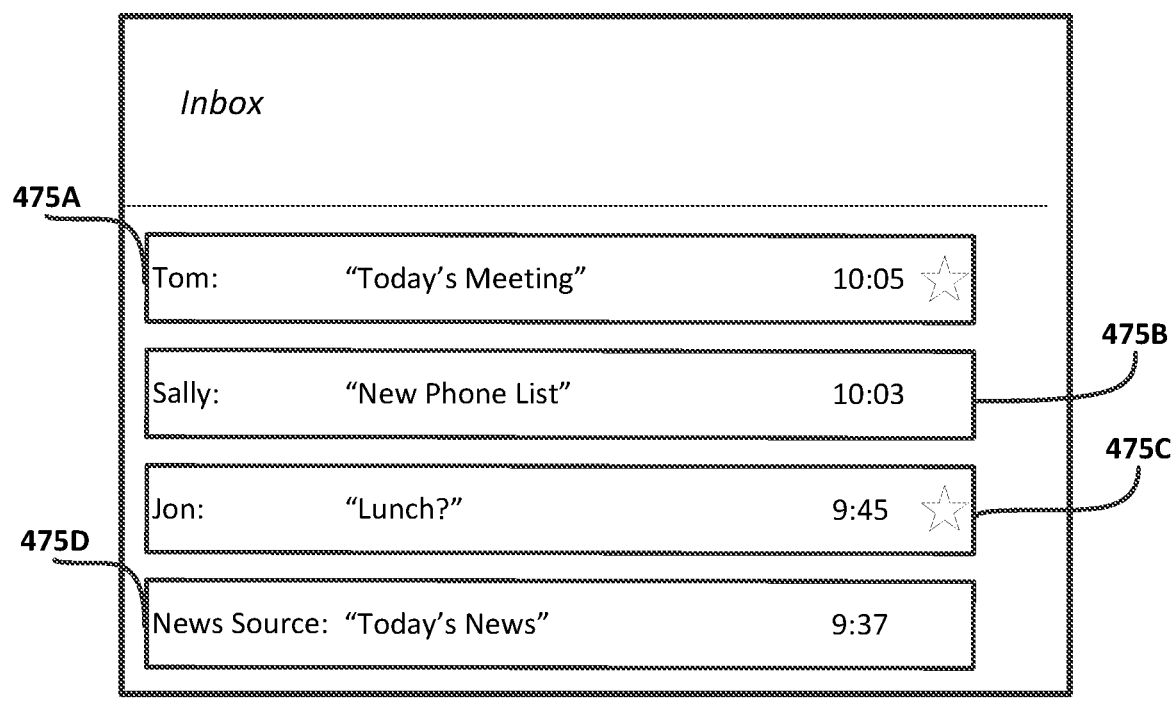

In FIG. 4C, a graphical interface is displaying graphical indications of a plurality of emails 475A-D of the user. Two of the emails (475A and 475D) are provided with a "star" that indicate those emails each likely request a commit be provided in a responsive reply message.

Figure 4D:
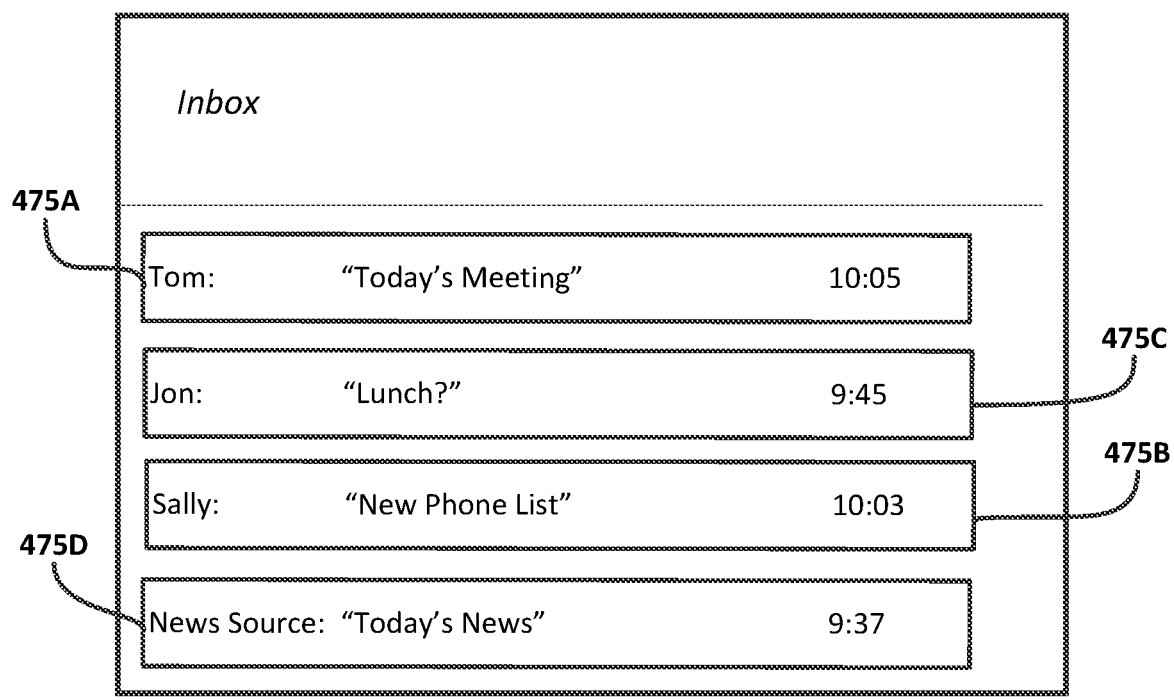

FIG. 4D displays the same emails 475A-D as displayed in FIG. 4C. However, in FIG. 4D the emails are listed in an order that is based on whether they are likely to contain an ask/request a commit be provided in a responsive reply message—whereas they are listed in a "most recent to least recent" order in FIG. 4C. In FIG. 4D, email 475A and email 475C are presented more prominently than other emails at least in part due to a determination that those emails each likely request a commit be provided in a responsive reply message. In some implementations, email 475A may be presented more prominently than email 475C based on being more recent than email 475C. In some implementations, email 475A may additionally or alternatively be presented more prominently based on being determined to include a stronger/more likely indication of an ask than email 475C.

Although FIGS. 4A-4D are presented as alternative examples, in many implementations one or more examples may be combined with other (and/or additional) examples. For example, in FIG. 4D emails 475A and 475C may also be presented with "stars" as in FIG. 4C. Also, for example, in FIG. 4A "let me know if you plan to attend" may also be underlined as in FIG. 4B.

Moreover, although FIGS. 4A-4D present particular examples, additional and/or alternative indications may be provided, and/or actions taken, in response to determining that an original message contains an ask. For example, in response to determining that an original message contains an ask, the original message may be provided to one or more computer applications and/or other component(s) that may populate a "to do list" with all or aspects of the original message, generate a "reminder" based on all or aspects of the original message, populate a calendar entry based on all or aspects of the original message, and/or perform other action based on the original message (and based on the original message having been determined to contain an ask). As another example, original messages determined to include an ask may be presented without presentation of "non-ask" messages in one or more graphical interfaces. In other words, the "non-ask" messages may be "filtered out".

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Figure 5:
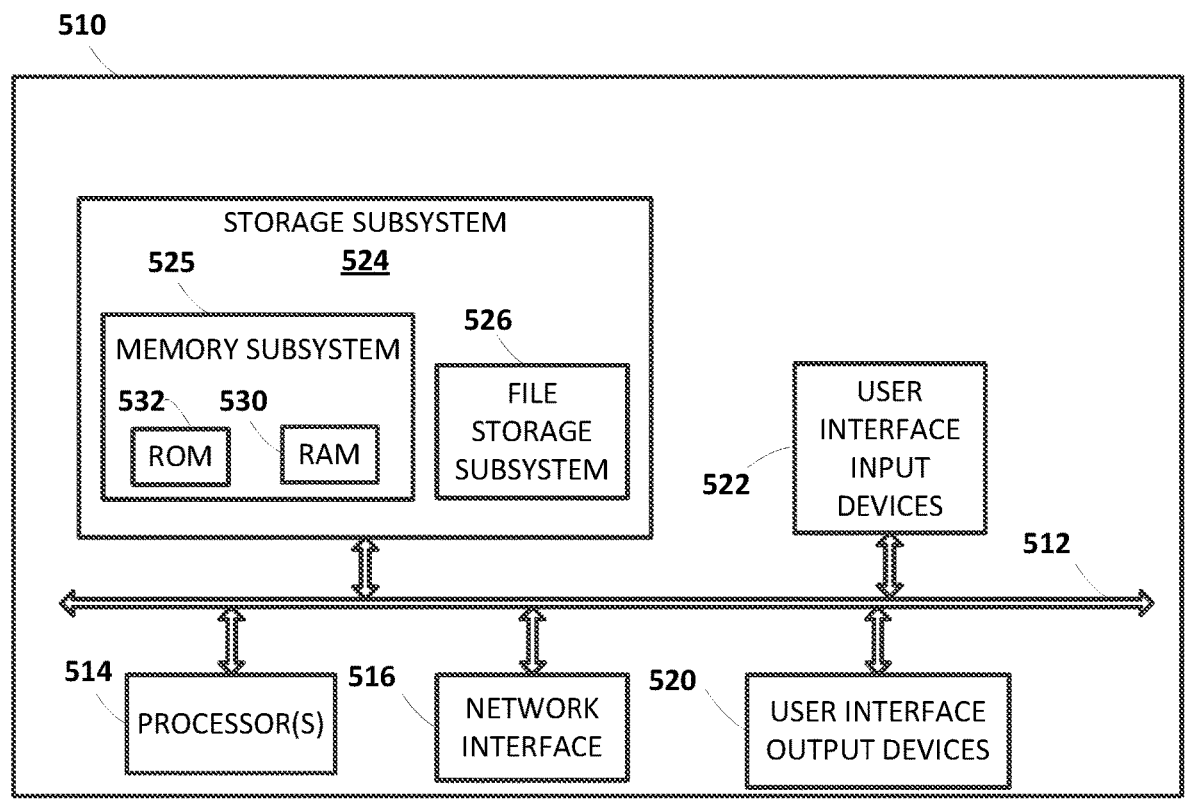
FIG. 5 illustrates an example architecture of a computing device.

FIG. 5 is a block diagram of an example computing device 510. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods of FIGS. 2A, 2B, 2C, 2D, and/or 3.

These software modules are generally executed by processor 517 alone or in combination with other processors. Memory 525 used in the storage subsystem can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 527, or in other machines accessible by the processor(s) 517.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
    identifying a corpus of electronic communications stored in one or more databases, wherein a plurality of the electronic communications of the corpus each include a reply message and an original message to which the reply message is responsive;
    identifying, from the corpus of electronic communications, a reply group of reply messages based on the reply messages of the reply group each being determined to include a commit in a body of the reply message;
    selecting, from the corpus of electronic communications, an original group of original messages based on the reply messages of the reply group being responsive to the original messages of the original group;
    generating positive training examples based on the original messages of the original group, each of the positive training examples including training example input based on original message features of a corresponding one of the original messages of the original group and including training example output that indicates presence of the commit;
    training a machine learning model based on the positive training examples;
    identifying a given electronic communication of the electronic communications of the corpus based on the original message of the given electronic communication not being included in the original group of the original messages;
    applying, as input to the trained machine learning model, given message features of the original message of the given electronic communication;
    determining, based on output generated over the trained machine learning model based on the input, that the commit is present in the reply message of the given electronic communication that is responsive to the original message of the given electronic communication;
    based on determining that the commit is present in the reply message of the given electronic communication, using reply message features of the reply message to select an additional reply group of reply messages that each include the commit;
    selecting an additional original group of the original messages based on the reply messages of the additional reply group being responsive to the original messages of the additional original group;
    generating additional positive training examples based on the original messages of the additional original group; and
    further training the machine learning model based on the additional positive training examples.

2. The method of claim 1, further comprising:
    identifying a new original message sent to a user;
    applying, as input to the further trained machine learning model, new original message features of the new original message; and
    determining, based on output generated over the further trained machine learning model based on the input, that the commit is likely to be present in a yet to be formulated new reply message that is responsive to the new original message.

3. The method of claim 2, further comprising:
    in response to determining that the commit is likely to be present in the yet to be formulated new reply message that is responsive to the new original message:
        providing, for presentation to the user via a computing device of the user, an indication that the commit is likely to be present in the new reply message.

4. The method of claim 3, wherein the indication is a visual indication applied to a graphical representation of the new original message.

5. The method of claim 4, wherein the visual indication is applied to the graphical representation of the new original message when the new original message is presented along with graphical representations of one or more additional messages, and wherein the graphical representation visually distinguishes the new original message from the one or more additional messages.

6. The method of claim 3, wherein the indication is provided for presentation to the user in response to the user interacting with the new original message via the computing device of the user.

7. The method of claim 1, wherein each of the reply messages of the reply group is determined to include the commit in the body of the reply message based on:
  applying each of the reply messages of the reply group to a trained commit classifier.

8. The method of claim 7, wherein using the reply message features of the reply message to select the additional reply group of the reply messages that each include the commit comprises:
  generating a commit classifier training example based on the reply message features;
  further training the commit classifier based on the commit classifier training example; and
  using the further trained commit classifier to select the additional reply group of the reply messages.

9. The method of claim 1, further comprising:
  determining that the commit is present in a threshold quantity of the reply messages that have the reply message features, the threshold quantity including the reply message;
  wherein using the reply message features of the reply message to select the additional reply group of reply messages that each include the commit is based on determining that the commit is present in the threshold quantity of the reply messages that have the reply message features.

10. A method implemented by one or more processors, comprising:
  identifying a corpus of electronic communications stored in one or more databases, wherein a plurality of the electronic communications of the corpus each include a reply message and an original message to which the reply message is responsive;
  selecting a group of the electronic communications from the corpus of electronic communications based on determining that the electronic communications of the group each have a corresponding original message that satisfies criteria of a model;
  determining reply message features based on their occurrence in a threshold quantity of the electronic communications of the group;
  using the reply message features to select an additional group of the electronic communications based on the electronic communications of the additional group each having a corresponding reply message that includes the reply message features;
  generating refined criteria for the model using original message features from original messages of the additional group of the electronic communications;
  identifying a new original message sent to a user;
  determining that the new original message satisfies the refined criteria for the model; and
  in response to determining that the new original message satisfies the refined criteria for the model:
    performing one or more further actions directed to the new original message, wherein performing the one or more further actions comprises:
      providing, for presentation to the user via a computing device of the user, an indication that sensorially distinguishes the new original message from other messages of the user.

11. The method of claim 10, wherein the indication is a visual indication applied to a graphical representation of the new original message.

12. The method of claim 11, wherein the visual indication is applied to the graphical representation of the new original message when the new original message is presented along with graphical representations of one or more additional messages.

13. The method of claim 10, wherein the indication is provided for presentation to the user in response to the user interacting with the new original message via the computing device of the user.

14. The method of claim 10, wherein the model is a machine learning model.

15. The method of claim 14, wherein generating the refined criteria for the model using original message features from the original messages of the additional group of the electronic communications comprises:
  generating a plurality of positive training examples based on the original message features; and
  generating the refined criteria for the model by training the machine learning model based on the positive training examples.

16. The method of claim 10, wherein using the reply message features to select the additional group of the electronic communications based on the electronic communications of the additional group each having a corresponding reply message that includes the reply message features comprises:
  refining a reply message model based on the reply message features; and
  using the refined reply message model to select the additional group of the electronic communications.

17. The method of claim 16, wherein refining the reply message model comprises:
  generating a plurality of positive training examples based on the reply message features; and
  training the reply message model based on the positive training examples.

18. A system, comprising:
at least one processor;
memory coupled to the processor, wherein the memory stores instructions that, when executed by the at least one processor cause the at least one processor to:
  identify a corpus of electronic communications stored in one or more databases, wherein a plurality of the electronic communications of the corpus each include a reply message and an original message to which the reply message is responsive;
  select a group of the electronic communications from the corpus of electronic communications based on determining that the electronic communications of the group each have a corresponding original message that satisfies criteria of a model;
  determine reply message features based on their occurrence in a threshold quantity of the electronic communications of the group;
  use the reply message features to select an additional group of the electronic communications based on the electronic communications of the additional group each having a corresponding reply message that includes the reply message features;
generate refined criteria for the model using original message features from original messages of the additional group of the electronic communications;
identify a new original message sent to a user;
determine that the new original message satisfies the refined criteria for the model; and
in response to determining that the new original message satisfies the refined criteria for the model:
 perform one or more further actions directed to the new original message, wherein the instructions to perform the one or more further actions comprise instructions to:
  provide, for presentation to the user via a computing device of the user, an indication that sensorially distinguishes the new original message from other messages of the user.

* * * * *